Aug. 31, 1926.

J. H. ARAKELIAN

FLEXIBLE CULTIVATOR

Filed July 2, 1923

1,597,949

INVENTOR.
John H. Arakelian
BY
ATTORNEY

Patented Aug. 31, 1926.

1,597,949

UNITED STATES PATENT OFFICE.

JOHN H. ARAKELIAN, OF TURLOCK, CALIFORNIA.

FLEXIBLE CULTIVATOR.

Application filed July 2, 1923. Serial No. 648,987.

This invention relates to improvements in ground working tools, and especially to cultivating, harrowing or similar implements.

The principal object of my invention is to provide a device of this character so constructed that while working the ground between two rows of trees or vines, it will also work the ground between the trees or vines in each row, without attention on the part of the operator, and at the same time will pass by the trunks or stems of the vines, etc., without damage thereto by bruising or cutting.

My implement is especially intended for use in vineyards, where with ordinary implements cultivation between the vines in a row must be done by hand. It is, however, suitable for general orchard or other work, when made in sizes suitable for the purpose.

The implement may also be made a complete unit in itself, or as an attachment to be applied to ordinary cultivators.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1:
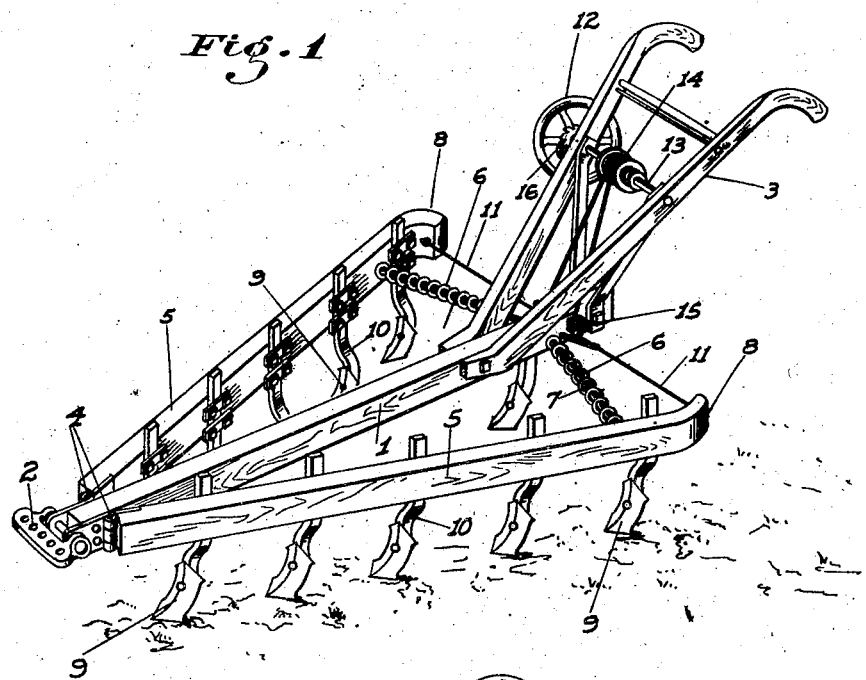
Fig. 1 is a perspective view of a cultivator embodying my improved flexible features.

Referring now more particularly to the characters of reference on the drawings, the numeral 1 denotes a main horizontal frame beam provided at the forward end with any suitable form of drawbar or clevis 2 and at its rear end with upwardly projecting handles 3 of common form.

Hinged to the front end of beam 1 on opposite sides thereof as at 4 and arranged for swinging movement in a horizontal plane are auxiliary beams 5, extending rearwardly to the end of the main beam and positioned at a diverging angle thereto from front to rear.

Said beams 5 are normally held in such positions by compression springs 6 extending between beams 5 and 1, and mounted on rods 7, swivelled onto beams 5 and slidable through beam 1.

The outer vertical faces of the beams 5 are preferably very smooth and without any projections such as bolt-heads or the like, and at their rear ends curve inwardly somewhat as at 8, for a purpose as will hereinafter appear.

Teeth 9 of any suitable character depend downwardly from the beams 5 and are secured on the inner faces thereof, the shanks or stems of said teeth being further bent inwardly of the beams just below the same as shown at 10, so that the teeth will lie in a vertical plane inwardly of that of the beam.

To forcibly draw the rear ends of the beams 5 toward the beam 1 when desired, or to hold them at any desired spacing against the pressure of the springs tending to force the beams apart, I provide flexible cables 11 or the like extending from the beams 5 to some form of control means on the beam 1, such as for instance that shown in Fig. 1, consisting of a hand-wheel 12 mounted on a shaft 13 journaled in the handle structure 3, the shaft having a drum 14 thereon on which are wound the ends of the cables 11, these passing between the beams 5 and the drums through direction-changing pulleys 15 mounted on the beam 1.

A pawl and ratchet mechanism indicated at 16 is associated with the hand-wheel to prevent the action of the springs 7 from causing rotation of said wheel, and the consequent drawing out of the cables, when not desired.

This type of control is used when both the flexibly mounted beams 5 are to be drawn in or let out simultaneously and with a relatively slow speed of movement, and would probably be employed only to regulate the spread of the cultivator to suit conditions at the outset of operations, or to make the implement compact for transportation when not in operation.

Figure 2:
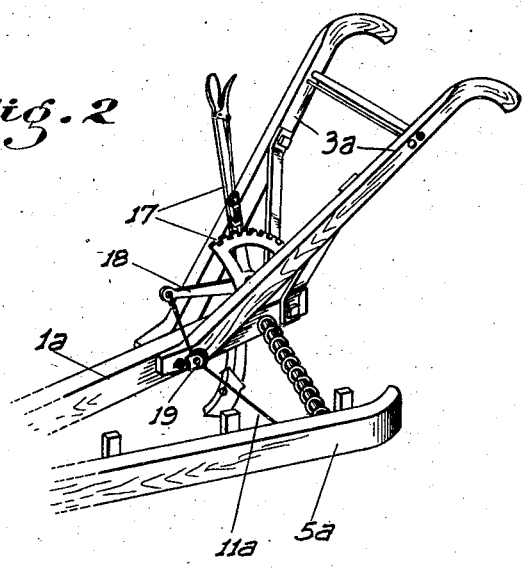
Fig. 2 is a fragmentary view showing a modified form of control means.

For quicker and individual control of the auxiliary beams, as when changes in the spread of the latter must be made when the implement is moving along and in actual operation, I provide a lever and quadrant structure such as is shown generally at 17 in Fig. 2, mounted between the handles 3ª. A substantially horizontal arm 18 extending from the pivotal end of the lever has connected to its outer end the control cable 11ª extending as before to one of the beams 5ª, passing intermediate its ends through a pulley 19 swivelly mounted on the main beam 1ª.

With this form of control, only one of the beams 5ª, if two were used, would be connected thereto, since the operator could only pay definite attention to one side at a time.

In operation, the implement is set so that the spread between the rear ends of the beams 5 is about equal to the spacing between center lines of the vines or trees of two rows, between which the cultivator is to travel. When moving between the vines of each row, the beams 5 may of course spread unrestrictedly to their full limit, and the teeth thereon will work the ground up to or even beyond the center line of the vines of each row. As the beams approach the vines, they will abut against the trunks or stems, and said beams, being flexibly mounted, will automatically give and move inwardly so that the vines will not be damaged nor the forward movement of the implement halted. When the vine is passed, the beams will again automatically spread. The teeth, being set inwardly of said beams in the manner hereinbefore described, will clear the roots of the vines, while the smooth outer surface of the beams, coupled with the inwardly curving rear ends, prevents cutting or bruising of the vine-trunks.

I have here shown and described the device as being a complete implement in itself, but if desired a single flexible beam and its accompanying parts may be made as an attachment to be applied to the side of a standard cultivator or other implement.

From the foregoing description it will be readily seen that I have produced such a device as substantially fulfills the objects of the invention as set forth herein.

While this specification sets forth in detail the present and prefered construction of the device, still in practice such deviations from such detail may be resorted to as do not form a departure from the spirit of the invention, as defined by the appended claim.

Having thus described my invention what I claim as new and useful and desire to secure by Letters Patent is:

In combination with a ground working implement which includes a main beam, an auxiliary beam hinged to the front end thereof and handles projecting upwardly from the rear end of the main beam; a flexible element attached to the auxiliary beam adjacent the rear end thereof, a direction changing pulley on the main beam adjacent its rear end, said element passing over said pulley and then continuing upwardly, hand operated means mounted between the handles and connected to the upper end of the element for raising the same and thereby drawing the auxiliary beam toward the main beam, a compression spring between the beams tending to spread the same, and holding the flexible element in tension, and releasable catch means applied to the hand operated means for preventing the same from being moved by the spring.

In testimony whereof I affix my signature.

JOHN H. ARAKELIAN.